April 11, 1961  B. ROGGE  2,979,085
CRIMPING DEVICE
Original Filed Dec. 17, 1954  2 Sheets-Sheet 1
Fig./
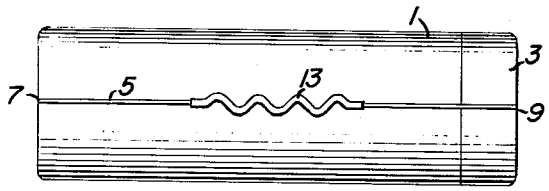
Fig.2
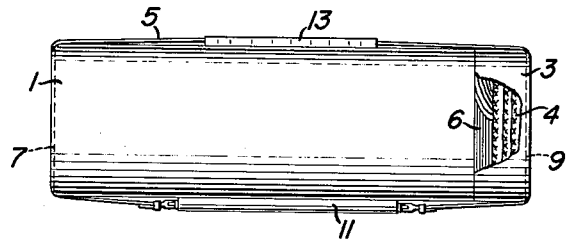
Fig.3
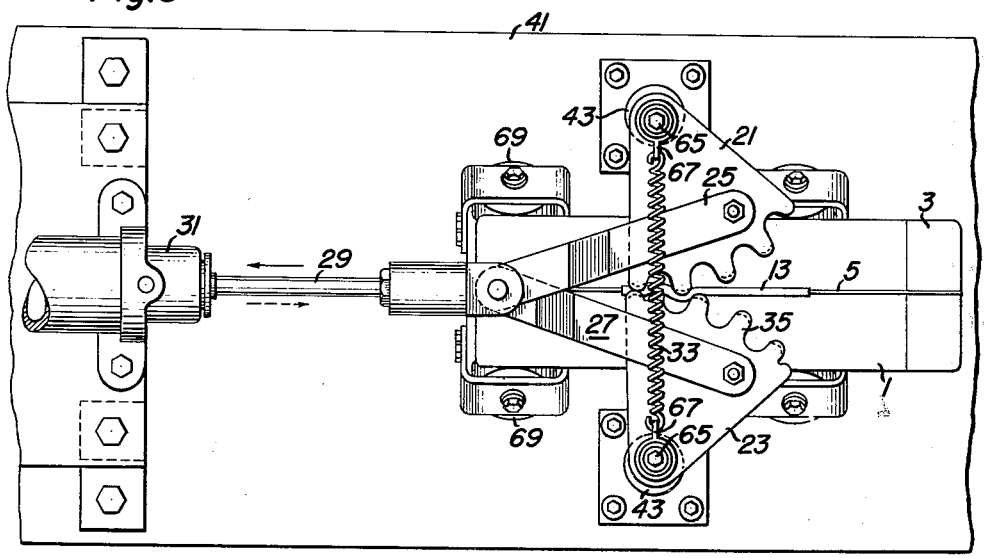
INVENTOR
Bernhard Rogge
BY George Renehan
ATTORNEY April 11, 1961   B. ROGGE   2,979,085
CRIMPING DEVICE
Original Filed Dec. 17, 1954   2 Sheets-Sheet 2

INVENTOR
Bernhard Rogge
BY
ATTORNEY

United States Patent Office 2,979,085
Patented Apr. 11, 1961

2,979,085
CRIMPING DEVICE

Bernhard Rogge, Baldwin, Md., assignor to the United States of America as represented by the Secretary of the Army Original application Dec. 17, 1954, Ser. No. 476,094, now Patent No. 2,868,125, dated Jan. 13, 1959. Divided and this application Oct. 20, 1958, Ser. No. 772,645

2 Claims. (Cl. 140—105)

(Granted under Title 35, U.S. Code (1952), sec. 266)

The invention described herein may be manufactured and used by or for the Government of the United States of America for governmental purposes without the payment to me of any royalty thereon.

This is a division of application S.N. 476,094, filed Dec. 17, 1954, now Patent No. 2,868,125, granted Jan. 13, 1959.

This invention relates to a plural component article and to a method of and means for securing the components together.

More specifically, the invention relates to a delay parachute bomb and to a method of and means for binding the components together with a uniform tension.

Objects of the invention are to provide a delay parachute bomb which will give uniform results in bomb dispersal and to provide a method of and means for performing one step of the assembly in which is adaptable to rapid manufacturing processes.

In the drawing, Fig. 1 is a top view of a bomb involving this invention.

Fig. 2 is a side view of the bomb shown in Fig. 1.

Fig. 3 is a top plan view of a crimping machine forming part of this invention, shown carrying out one of the steps in my method of assembly.

Figure 4:
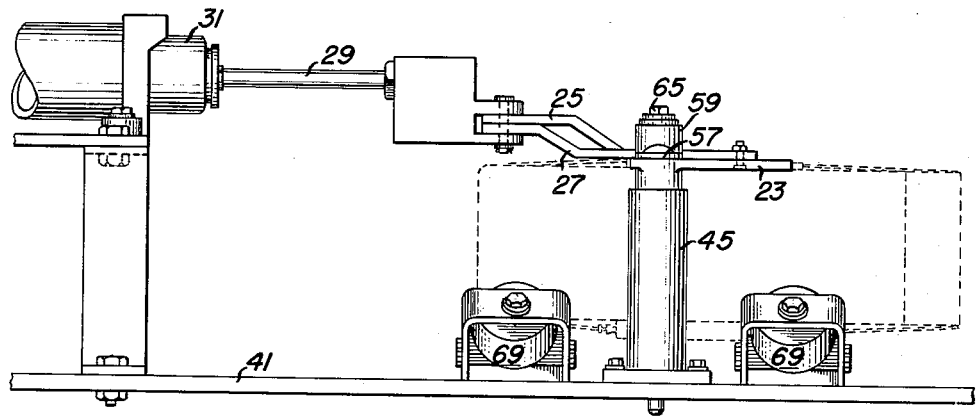
Fig. 4 is a side view of the device shown in Fig. 3.
Figure 5:
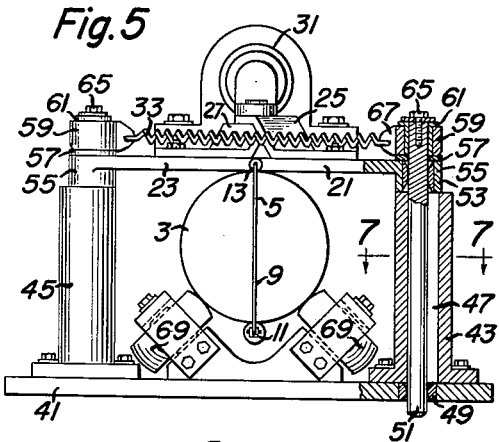
Fig. 5 is an end view of the device shown in Fig. 3, with parts shown in section.

In various manufacturing processes, composite articles are bound together by encircling wires, straps, or the like. It is frequently desirable that the wires or straps be given a specified tension which is the same for all articles. It is, of course, also desirable that the entire process be one which can be carried out rapidly on a mass production basis.

One particular instance where this problem exists is in the field of delay parachute bombs. Certain types of aerial bombs employed in clusters are formed with a cylindrical body having a cover at one end, which cover houses a folded parachute which is secured to the bomb body. The cover is secured to the body by a retaining wire or cable which encircles the bomb in a longitudinal direction. The ends of the wire are secured to a delay mechanism which releases the wire a fixed time after the bomb has left the cluster. This allows the cover to separate from the body. The opening of the parachute initiates a series of actions which eventually result in the explosion of the bomb. One particular bomb of this type is described in an application of A. S. Berlin et al., Serial No. 579,122, filed April 18, 1956, now Patent No. 2,920,561.

In order to secure proper dispersal of the bombs and release of the parachute, it is important that the exterior of the bombs be uniform and free from elements which might become entangled and that the retaining wires have a substantially uniform tension. It is also important that the bomb be capable of rapid and convenient assembly.

I attain these results by providing the wire with an inclosing sleeve, preferably positioned on the side of the bomb opposite the delay, and crimp the tube and wire until a predetermined tension is obtained. I have provided for this purpose a special crimping device which crimps the sleeve, beginning at one end, and becomes inactive when the specified tension is obtained.

The bomb is shown in Figs. 1 and 2. It comprises a bomb body 1 and a cover 3. Within the cover is a folded parachute 4 which is connected to body 1 at 6. The cover is held on the bomb body by retaining wire 5, the ends of the body and cover being provided with diametral grooves 7 and 9 respectively, to prevent lateral slipping of the wire. Preferably wire 5 is a stranded steel wire. The ends of the wire 5 are joined to a delay 11. In use, these bombs are clustered in a cluster adapter which is dropped from an airplane and at a proper time are released from the cluster. The delay 11 is so constructed that, at a fixed time after leaving the cluster, the wire 5 is released. This allows the cover 3 to fall off, releasing the parachute. The opening of the parachute initiates a series of actions, not material to this case, which eventually result in detonation of the bomb.

In order to secure proper operation of the bomb, the wire 5 should be tensioned to a certain degree. The manner in which tensioning is secured constitutes the heart of my invention.

Figures 8, 9, 10:
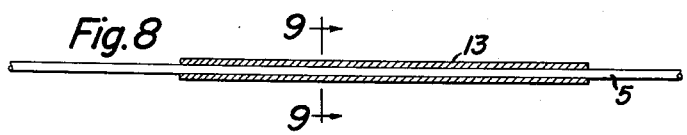
Fig. 8 is a longitudinal sectional view of the wire 5 and sleeve 13, Fig. 1, before crimping.
Fig. 9 is a section on line 9—9, Fig. 8.
Fig. 10 is a section similar to Fig. 9 showing a modified form of sleeve.

Surrounding wire 5 intermediate its ends, I provide an elongated sleeve 13 (see Figs. 1, 2, 8 and 9) formed of malleable metal such as copper or mild steel but relatively heavy and stiff as compared to wire 5. The sleeve is preferably tubular, as shown in Fig. 9, but may also have a cross section in the form of a relatively long U, as shown at 14 in Fig. 10. This latter modification is more bulky than the tubular form, but in some cases facilitates assembly. The wire is tensioned by crimping the tube 13. As will later be described in detail, the tube is progressively crimped from one end until a specific tension is obtained.

Preferably the tube 13 is positioned, as shown, on the opposite side of the bomb from delay 11 in order that it may lie in a long straight portion of wire and in order that it may be crimped without disturbing the delay. The crimping should be tangential to the bomb in order that the crimped portion may lie flat.

The crimped sleeve has been found in actual practice to be a highly desirable means of maintaining tension. It is positive in action and will retain high tensions in the wire. As compared to turnbuckles, for example, it does not tend to produce any twisting or dislocation of the delay 11. As compared to springs, it has no tendency to become entangled with parts of adjacent bombs. Moreover, it is very economical and is adapted to rapid assembly in mass production. The tubular sleeve is particularly desirable since when crimped tangentially to the bomb it forms no projections.

A crimping device for use in crimping the tube to the specified tension is shown in Figs. 3 through 7.

The basic elements of the device are two sectors 21, 23 which are rotated about their respective axes by links 25, 27. These links are connected to piston rod 29, which is actuated by pneumatic cylinder 31. The axes of the sectors are movable toward and away from each other, as will later be described in detail. They are urged toward each other by spring 33, but are free to move outwardly against the action of the spring.

Figure 6:
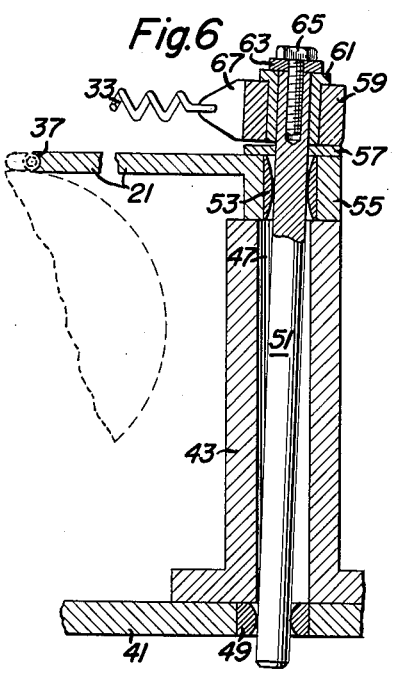
Fig. 6 is enlarged sectional view corresponding to the right hand portion of Fig. 5, but at a different stage of operation.

The sectors 21 and 23 are provided with crimping teeth 35. As shown in Fig. 6, these teeth have grooved edges 37 to receive and hold the tubular sleeve 13. When the sectors are held inwardly by the spring 33 the teeth 35 mesh and crimp the sleeve 13. When the axes move outwardly against the action of the springs, crimping becomes shallower or ceases completely.

Figure 7:
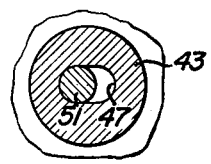
Fig. 7 is a section taken on line 7—7, Fig. 5.

The mounting of sectors 21, 23 is shown in Figs. 4, 5, 6 and 7. The crimping device is provided with a base 41 on which are supported two columns 43 and 45. These columns are provided with bores 47 which, as shown in Fig. 7, are elongated in cross section. Mounted in the base plate in alignment with each bore is a bell-mouthed bearing 49. A shaft 51, which constitutes the axis of a sector, is journalled in each bearing 49. Sectors 21, 23 are journalled on the respective shafts by bell-mouthed bearings 53. Each sector is formed with a hub 55 which rests in sliding engagement on the top of column 43 or 45. A washer 57 is superposed on each hub and on each washer rests a sleeve 59 provided with a flanged bearing 61. A washer 63 and a stud 65 hold the parts in engagement.

Each sleeve is provided with an ear 67 which is engaged by one end of spring 33. The spring 33 normally holds the shafts 51 toward each other so that they rest against the inner wall of bore 47, as shown in the right hand portion of Fig. 5.

Rollers 69 are mounted on the base in such a position as to support the bomb during the crimping operation and desirably form part of a more extended roller conveyor.

The mode of operation is as follows. In the assembly process, a sleeve 13 is placed on wire 5. The wire 5 is then placed around bomb body 1 and cover 3 and the ends are joined to delay 11, the sleeve 13 being positioned on the opposite side of the bomb from the delay. The bomb is then positioned on rollers 69 with sleeve 13 on top, as shown in Fig. 3. The sectors being open, i.e. moved to the right in Fig. 3, the bomb is so positioned that the left hand teeth 35 will engage sleeve 13 near its left hand end. Pneumatic cylinder 31 is then operated so as to move piston rod 29 to the left, rotating the segments and crimping the tube 13 and tensioning wire 5. As the tension increases, the radially outward pressure on sectors 21, 23, and hence the tension on spring 33, will increase. Spring 33 is originally stretched so that it is pretensioned to, say, fifty pounds. When the radial pressure on sectors 21, 23, exceeds this amount, the shafts 51 will be tilted outwardly, as shown in Fig. 6, against the action of the spring. The teeth 35 will then no longer mesh and the crimping will cease. By selecting of a spring of the proper length and modulus, the tension in wire 5 at which the crimping will cease can be determined. Thus, each bomb will have its retaining wire 5 given the correct tension regardless of slight differences in the length of the wires.

While I have described in detail a preferred form of my method and apparatus, it will be understood that variations are possible. I therefore wish my invention to be limited solely by the scope of the appended claims.

I claim:

1. A crimping device comprising a base and two parallel columns positioned perpendicularly thereon, each column having a longitudinal bore, a first bell-mouthed bearing mounted in the base adjacent the end of the respective column, a shaft in each bore journalled in said first bearings, said bores being of such size and shape as to permit said shafts to tilt in said first bell-mouthed bearings in the plane passing through the axes of said shafts, a toothed sector slidably mounted on each column, a second bell-mouthed bearing mounted in each said sector and journalled on the respective shaft, the teeth of said sectors meshing when said shafts are urged toward each other, resilient yielding means engaging the shafts adjacent said sectors and biasing the upper end of said shafts toward each other, a pair of links, each of said links being connected at one end to a sector, and common operating means connected to the other ends of said links.

2. A device as defined in claim 1 wherein said resilient yielding means is a spring under tension joining said shafts.

References Cited in the file of this patent

UNITED STATES PATENTS

| 318,062 | Warren et al. | May 19, 1885 |
| 1,657,695 | Richardson | Jan. 31, 1928 |

FOREIGN PATENTS

| 462,293 | France | Jan. 23, 1914 |